United States Patent
Nishimoto et al.

[11] Patent Number: 5,984,042
[45] Date of Patent: Nov. 16, 1999

[54] ELECTRIC POWER STEERING APPARATUS

[75] Inventors: Mitsuhiko Nishimoto, Kashihara; Kazuyuki Yoshida, Sakurai; Atsushi Igo, Yamatokooriyama, all of Japan

[73] Assignee: Koyo Seiko Co., Osaka, Japan

[21] Appl. No.: 08/805,036

[22] Filed: Feb. 21, 1997

[30] Foreign Application Priority Data

Feb. 21, 1996 [JP] Japan .................................. 8-033900

[51] Int. Cl.⁶ .................................................. B62D 5/04
[52] U.S. Cl. .............................. 180/446; 180/443; 701/42
[58] Field of Search .............................. 180/443, 446, 180/400; 701/41, 42

[56] References Cited

U.S. PATENT DOCUMENTS

| | | |
|---|---|---|
| 4,735,271 | 4/1988 | Shimizu . |
| 4,754,829 | 7/1988 | Shimizu . |
| 4,802,544 | 2/1989 | Maeda . |
| 4,979,114 | 12/1990 | Oshita et al. ............................ 180/446 |
| 5,201,818 | 4/1993 | Nishimoto .............................. 180/446 |
| 5,404,960 | 4/1995 | Wada et al. ............................. 180/79.1 |
| 5,444,622 | 8/1995 | Takeshima et al. ..................... 180/446 |
| 5,569,991 | 10/1996 | Matsuoka et al. ....................... 180/446 |
| 5,596,252 | 1/1997 | Shimizu et al. ......................... 180/446 |
| 5,612,877 | 3/1997 | Shimizu et al. ......................... 180/446 |
| 5,740,040 | 4/1998 | Kifuku et al. .......................... 180/446 |
| 5,767,642 | 6/1998 | Furukawa ................................ 180/446 |
| 5,809,438 | 9/1998 | Noro et al. ................................ 701/42 |
| 5,839,537 | 11/1998 | Nishino et al. ........................... 701/41 |

Primary Examiner—Daniel G. DePumpo
Attorney, Agent, or Firm—Darby & Darby

[57] ABSTRACT

An electric power steering apparatus comprising dead zone detecting device for detecting whether a detected value of a steering torque is no more than a predetermined value, that is, in a dead zone or not, steering angular velocity detecting device for detecting the rotation speed of a steering wheel, and motor braking device for braking a motor by short-circuiting the terminals of the motor by the PWM control corresponding to the rotation speed of the steering wheel detected by the steering angular velocity detecting device when the detected value of the steering torque is detected to lie in the dead zone.

8 Claims, 8 Drawing Sheets

FIG. 8

ELECTRIC POWER STEERING APPARATUS

BACKGROUND OF THE INVENTION

The present invention relates to improvement of an electric power steering apparatus for assisting steering force by rotationally driving a motor for assisting steering force. Pulse with modulation (PWM) control of the motor is used with a target value of the motor current determined on the basis of the detected amount of the steering torque used as a target amount for automatic control.

In an electric power steering apparatus for rotationally driving a motor for assisting steering force by PWM control based on the current target value of the motor determined on the basis of the detected amount of steering torque and the detected amount of the driving current for the motor, steering wheel return current is fed to the motor to carry out steering wheel return control. When the steering wheel returns near its neutral position (steering angle) at which the vehicle is advanced straight ahead, the steering wheel return current is set to zero.

However, even when the steering wheel returns to its neutral position, owing to the inertia force of the motor, the steering wheel does not instantly stop rotating but goes beyond the neutral position (0 deg) and then turns back like a pendulum, until it converges on the neutral position. Because of this, it takes time before the steering wheel converges on the neutral position and stops, during which time the vehicle running condition is not stabilized. The effect of this phenomenon is especially large at high speeds.

In order to solve such problem, various proposals have been made such as one described in U.S. Pat. No. 4,754,829 which is designed to brake the motor for steering assistance when certain conditions of steering torque and steering rotation speed are satisfied, either one or both of which are changed by the vehicle speed. A steering system described in U.S. Pat. No. 4,802,544 is designed to effect braking by short-circuiting the two terminals of the motor for assisting steering force when the vehicle speed exceeds a predetermined value and steering is stopped. The steering system described in U.S. Pat. No. 4,735,271 is designed to brake the motor for assisting steering force when the steering torque does not exceed a predetermined value, steering rotation speed is more than a predetermined value, and the steering system is at the neutral position.

Also, there has been proposed a steering system as described in U.S. Pat. No. 4,735,271 which is designed to brake the motor for assisting steering force when the steering torque does not exceed a predetermined value and the rotation speed of the motor for assisting steering force is higher than a predetermined value. In all those disclosures, however, due to the abrupt exertion of the braking force, the shock of braking is conveyed to the steering wheel to give unsatisfactory braking feeling.

BRIEF SUMMARY OF THE INVENTION

The present invention has been made to overcome the problems described above. An object of the present invention is to provide an electric power steering apparatus which gives good steering feel and which permits quick return of a steering wheel to the neutral position.

An electric power steering apparatus according to the present invention comprises dead zone detecting means for detecting whether a detected value of the steering torque is in a dead zone wherein the value is no more than a predetermined value. A steering angular velocity detecting means detects the rotation speed of the steering wheel, and motor braking means brakes the steering system motor by short-circuiting its terminals by the PWM controller in proportion to the rotation speed of the steering wheel detected by the steering angular velocity detecting means when the detected value of the steering wheel torque is in the dead zone.

By these means it is possible to control the braking force on the motor for assisting steering in proportion to the rotation speed of the steering wheel in the dead zone in which the steering wheel returns with smooth the variation of the braking force. Therefore, braking to the motor, the shock exerted on the steering wheel is small, steering feel is good, and it is possible to return the steering wheel quickly to the neutral position.

Further, the apparatus comprises absolute steering angle detecting means for detecting the steering angle from the neutral point of the steering angle in the steering wheel, and motor braking means brakes the motor when the steering angle detected by the steering angle detecting means is smaller than a predetermined value. Thus, the convergence control of the steering wheel is prevented from causing an obstacle to the return of the steering wheel, without overlapping the return control of the steering wheel.

Further, the motor braking means causes and increase or decrease in the duty factor in the PWM control in a range larger than a predetermined range according to the increase or decrease of the rotation speed when the rotation speed is larger than a predetermined value. That is when the braking force based on a reversal electromotive force of the motor is effectively large. On the other hand, when the rotation speed of the steering wheel is smaller than the predetermined value, the braking force is not effective, and the rotation force of the steering wheel is small, so no converging control of the steering wheel is performed. Accordingly, conversion control of the steering wheel can be effected only when the rotation speed of the steering wheel is larger than the predetermined value.

Further, the apparatus is equipped with a vehicle speed sensor. The motor braking means receive a vehicle speed signal from the vehicle speed sensor and increase or decrease the duty factor of PWM control according to the increase or decrease of the vehicle speed when the value of the vehicle speed is larger than a predetermined value. Accordingly, converging control of the steering wheel in proportion to the vehicle speed can be carried out during the high speed operation in which the effect of taking time is large, until the steering wheel comes to stop by converging.

The above and further objects and features of the invention will more fully be apparent from the following detailed description with accompanying drawings.

DETAILED DESCRIPTION OF THE INVENTION

Hereinafter, the present invention is described in detail with reference to the drawings to show the embodiments thereof.

Figure 2:
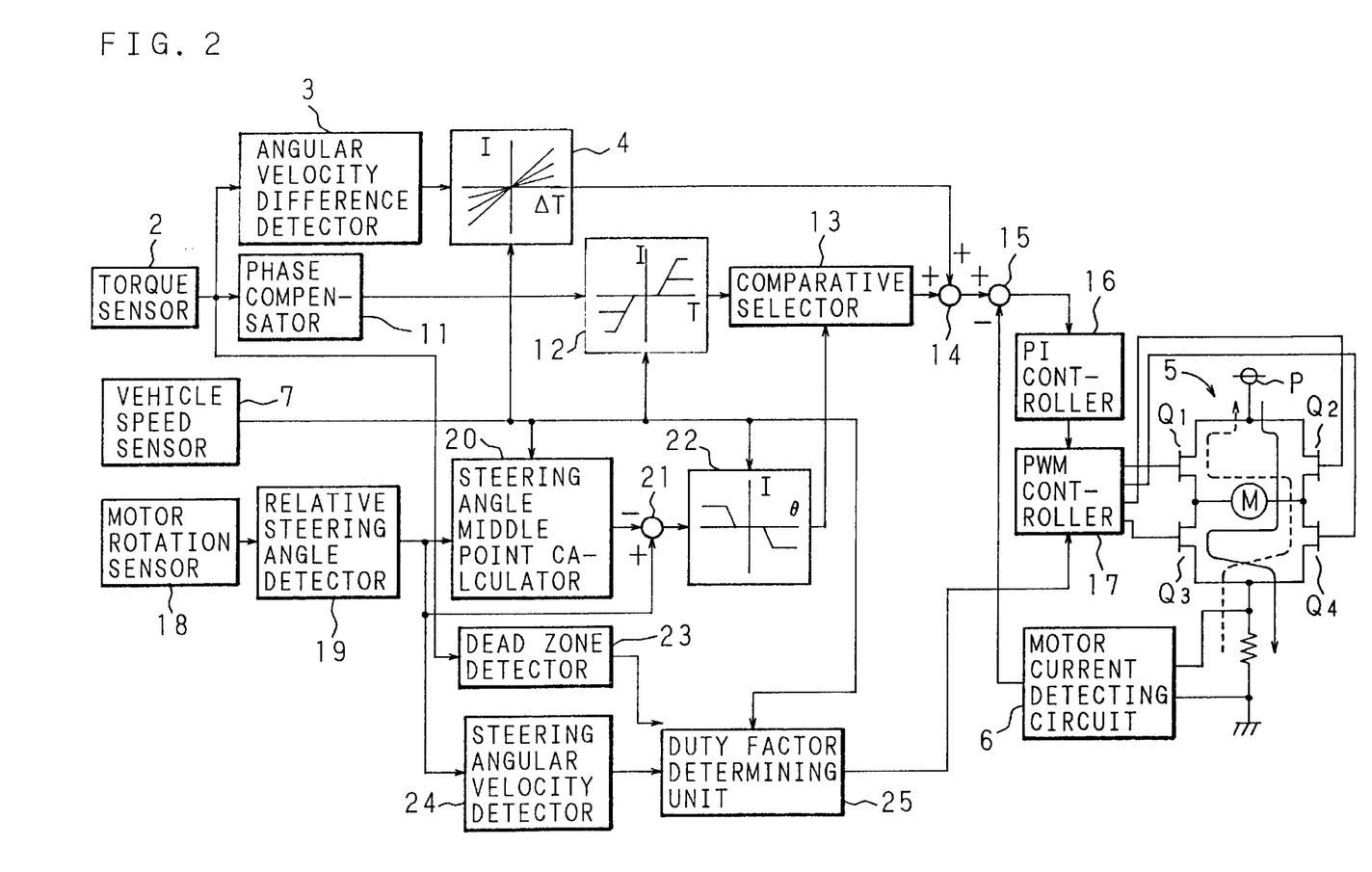
FIG. 2 is a block diagram showing the constitution of an essential part of an electric power steering apparatus according to the present invention.

FIG. 2 is a block diagram showing a constitution of an essential part of an electric power steering apparatus in an embodiment according to the present invention. In this electric power steering apparatus, a steering torque signal from a torque sensor 2 provided on a steering shaft is phase compensated by a phase compensator 11 and then provided to an assist controller 12.

A vehicle speed signal from a vehicle speed sensor 7 is provided to the assist controller 12, an angular velocity difference controller 4, a steering wheel return controller 22, a steering angle neutral point calculating controller 20, and a duty factor determining unit 25. The assist controller 12 outputs a target current value based on the steering torque signal from the phase compensator 11 and the vehicle speed signal from the vehicle speed sensor 7, providing it to a comparative selector 13. On the other hand, the steering torque signal from the torque sensor 2 is differentiated by an angular velocity difference detector 3 and the differentiated value is given to the angular velocity difference controller 4. The angular velocity difference controller 4 outputs a current value proportional to the differential value of the given steering torque signal and the vehicle speed signal from the vehicle speed sensor 7 providing it to an addition means 14. This current value is used for compensating inertia of a motor M.

A motor revolution number signal from a motor rotation sensor 18 for detecting the number of revolution of the motor M for assisting steering force is provided to a relative steering angle detector 19, and the relative steering angle detector 19 detects the relative steering angle of a steering wheel from the motor revolution number signal and provides the relative angle data to the steering angle neutral point calculator 20, a subtraction means 21, and a steering angular velocity detector 24.

The steering angle neutral point calculator 20 calculates the neutral point of the steering angle of the steering wheel where a vehicle advances straight ahead, and gives the results of the calculation to the subtraction means 21. The subtraction means 21 subtracts the given calculation results from the relative steering angle, to obtain the absolute steering angle, which is the steering angle deviation from the neutral point of the steering angle, and provides a signal representing the same to a steering wheel return controller 22.

The steering wheel return controller 22 outputs the target current value of the motor M for returning the steering wheel, based on the absolute steering angle and the vehicle speed signal from the vehicle speed sensor 7, and provides it to the comparative selector 13.

The comparative selector 13 provides the target current value from the assist controller 12 to the addition means 14 when the target current value is not approximately zero, and provides the target current value from the steering wheel return controller 22 to an addition means 14 when the target current value is approximately zero.

The addition means 14 adds the current value provided from the angular velocity difference controller 4 to the given target current value, and provides the result of the addition to a subtraction means 15.

The subtraction means 15 obtains the deflection between the addition result from the addition means 14 and the feedback value of the driving current of the motor M detected by a motor current detection circuit 6 and provides the deflection to a PI controller 16. The PI controller 16 adds the deflection (proportional element) and integrated value (integration element) of the deflection to the control amount of the previous case, and provides it to a PWM controller 17 as the current control amount.

The PWM controller 17 converts the control amount to a PWM wave signal and a signal to represent the direction of rotation of the motor and provides the results to a driving circuit 5. The driving circuit 5 has the constitution of the four FETs Q1, Q2, Q3 and Q4 in H-type bridge, with the motor M installed on the bridging part thereof.

The steering angular velocity detector 24 detects from the given relative steering angle a steering angular velocity which is a rotation speed of the steering wheel, and provides it to the duty factor determining unit 25 as a steering angular velocity signal.

The steering torque signal from the above-described torque sensor 2 is also provided to a dead zone detector 23. The dead zone detector 23 detects whether the given steering torque signal is in the dead zone of the assist controller 12 or not, and gives the detection signal thereof to the duty factor determining unit 25. The steering torque signal inputted to the dead zone detector 23 is to be value prior to the phase compensation. This is because, in the steering torque signal after the phase compensation, a differential element is added to detect a dead zone decrease.

The duty factor determining unit 25 determines a duty factor for PWM control for braking the motor M in accordance with the vehicle speed signal from the vehicle speed sensor 7, the dead zone detection signal from the dead zone detector 23, and the steering angular velocity signal from the steering angular velocity detector 24, and provides the duty factor to the PWM controller 17. Braking of the motor M is effected to converge quickly to the neutral position upon return of the steering wheel.

When the control amount from the PI controller 16 is approximately zero and the duty factor from the duty factor determining unit 25 is larger than a predetermined amount, the PWM controller 17 makes the two terminals of the motor M in the driving circuit 5 short-circuited via the PWM control based on the duty factor from the duty factor determining unit 25, to provide a state in which the current flows on the basis of the inverse electromotive force.

Unless a steering wheel angle is within the range of the dead zone of the steering angle of the steering wheel return controller 22 (e.g. ±15 deg), the PWM controller 17 does not carry out PWM control with the duty factor from the duty factor determining unit 25.

Figure 3:
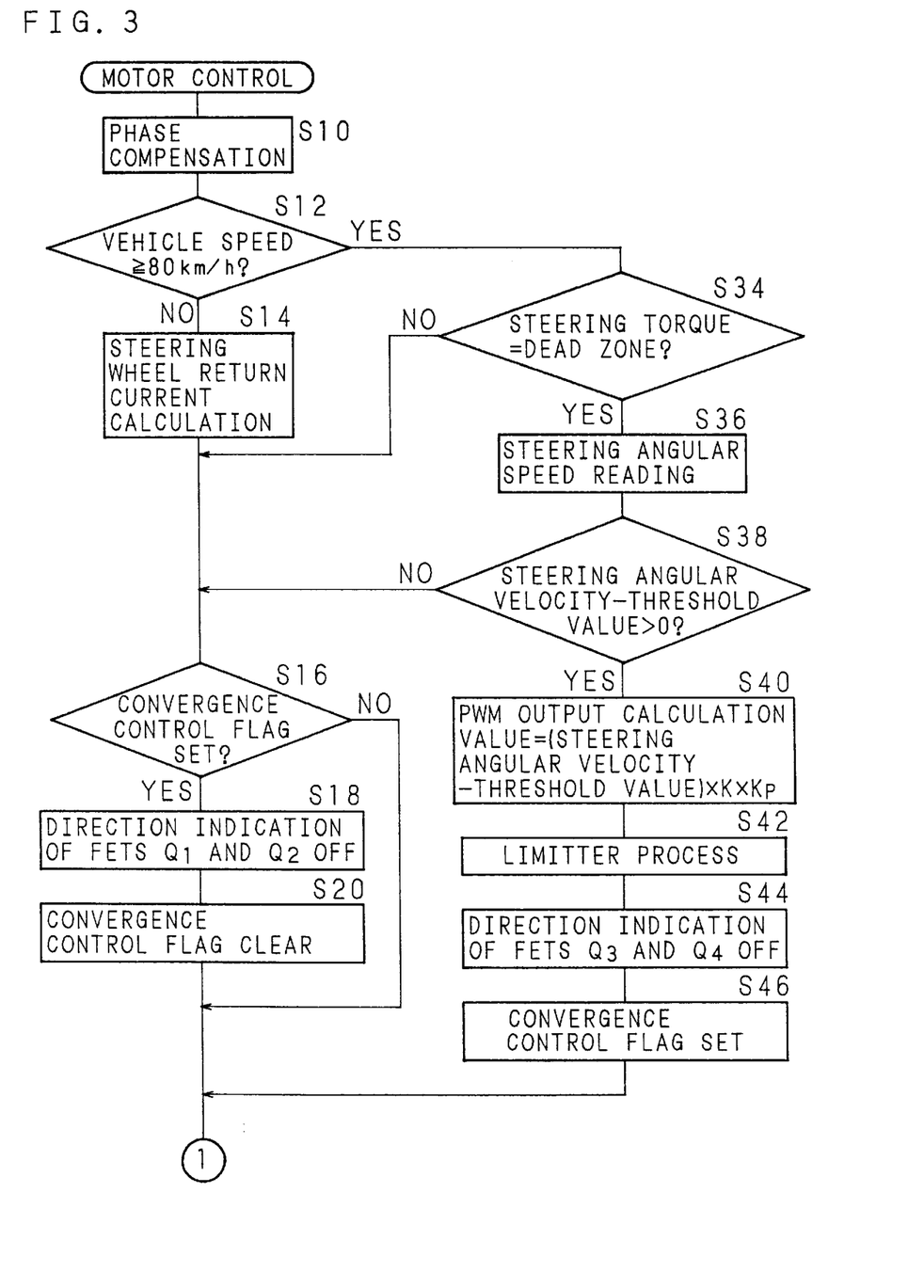
FIG. 3 is a flow chart showing a calculation for returning a steering wheel to a neutral position in the electric power steering apparatus according to the present invention.
Figure 4:
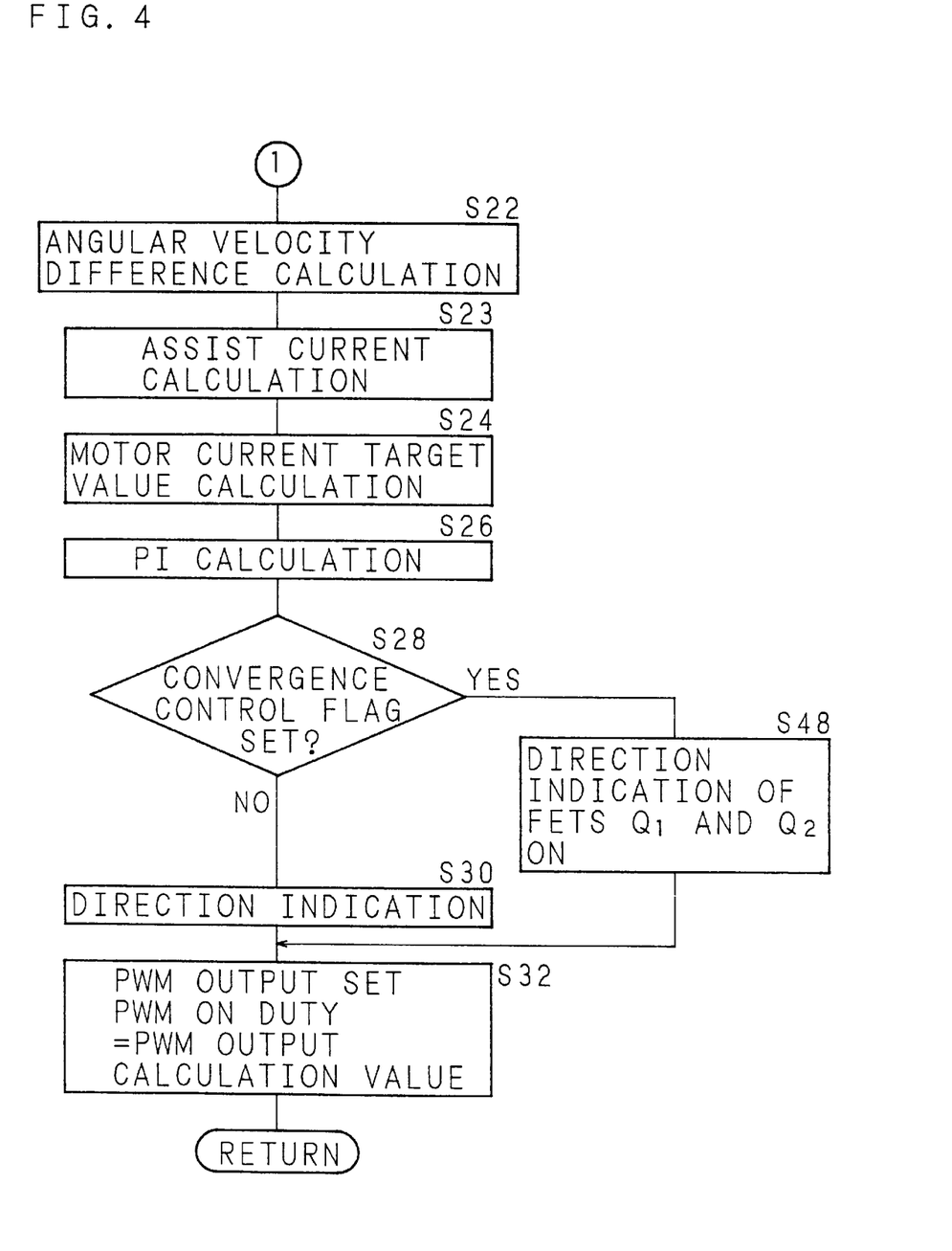
FIG. 4 is a flow chart showing the calculation for returning the steering wheel to the neutral position in the electric power steering apparatus according to the present invention.

Hereinafter, as is explained the calculation of the electric power steering apparatus of the above embodiment in returning the steering wheel to the neutral position, referring to the flow charts (FIGS. 3, 4).

First, phase compensation of the steering torque signal from the torque sensor 2 is carried out in the phase compensator 11 (S10). Next, when the vehicle speed signal from the vehicle speed sensor 7 indicates for example less than 80 km/h (S12), in order to make the motor M return the steering wheel to the neutral position, the steering wheel returning current is calculated in the steering wheel returning controller 22 based on the absolute steering angle and the vehicle speed (S14).

Next, when a convergence control flag is set and the control in the previous time was the convergence control for quickly converging the steering wheel to the neutral position (S16), of the four feel the effect transistors (FETs) Q1, Q2, Q3, and Q4 which constitute the H-type bridge of the driving circuit 5, the direction indications of the FETs Q1 and Q2 on the high voltage side are turned OFF (S18). The FETs Q1, Q2, Q3 and Q4 are turned ON according to the PWM signal specifically when the PWM signal is in a state in which the direction indications are off. In the case the convergence control, the direction indications of the FETs Q1 and Q2 are in the ON state, and therefore, in case of the steering wheel return control, they are first set to the OFF state.

Next, the convergence control flag is cleared (S20).

When the convergence control flag is not set (S16), there is not practiced either the turning OFF of the direction indications of FETs Q1 and Q2 (S18) and clearing of the convergence control flag (S20) are skipped.

In case the vehicle speed signal from the vehicle speed sensor 7 indicates 80 km/h or more (S12), if a dead zone of the assist controller 12 of the steering torque is detected by the dead zone detector 23 (S34), the steering angular velocity is read from the steering angular velocity detector 24 by the duty factor determining unit 25 (S36). If a dead zone is not detected (S34), examination is made as to whether the converging control flag is set or not (S16).

Next, when the read (S36) steering angular velocity is not more than the threshold value (e.g. 205 deg/s) (S38), examination is made as to whether the convergence control flag is set or not (S16).

Figure 6:
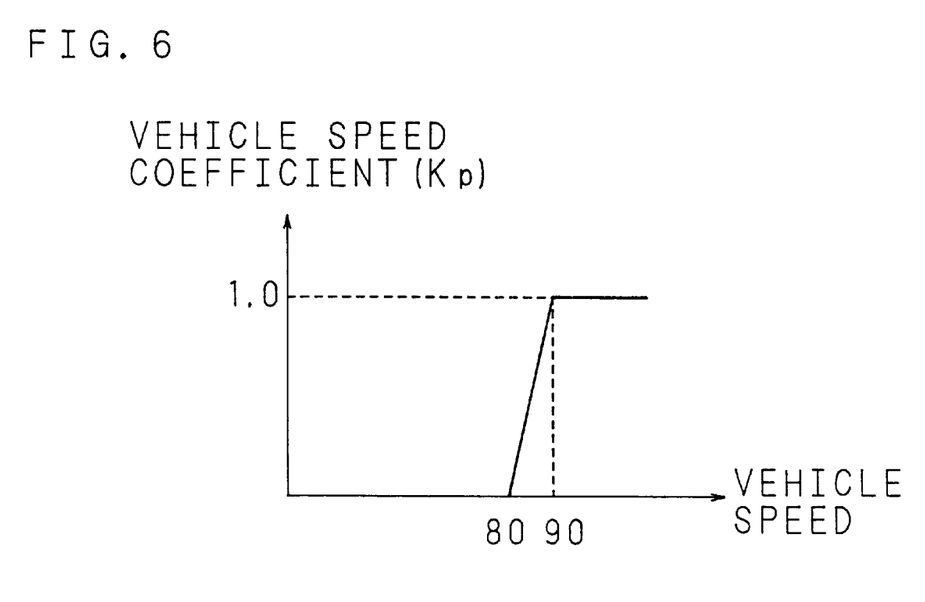
FIG. 6 is a view illustrating the vehicle speed coefficient to the vehicle speed of the electric power steering apparatus according to the present invention.

When the read (S36) steering angular velocity exceeds the threshold value (S38), calculation is made of the duty factor of the PWM control, i.e. PWM output calculating value= (steering angular velocity−threshold value)×K×Kp, is calculated to provide a vehicle speed factor the PWM controller 17, where, K is a control gain, Kp is, as shown in FIG. 6. The vehicle speed factor becomes 0→1.0 when the vehicle speed is 80 km/h→90 km/h.

Figure 5:
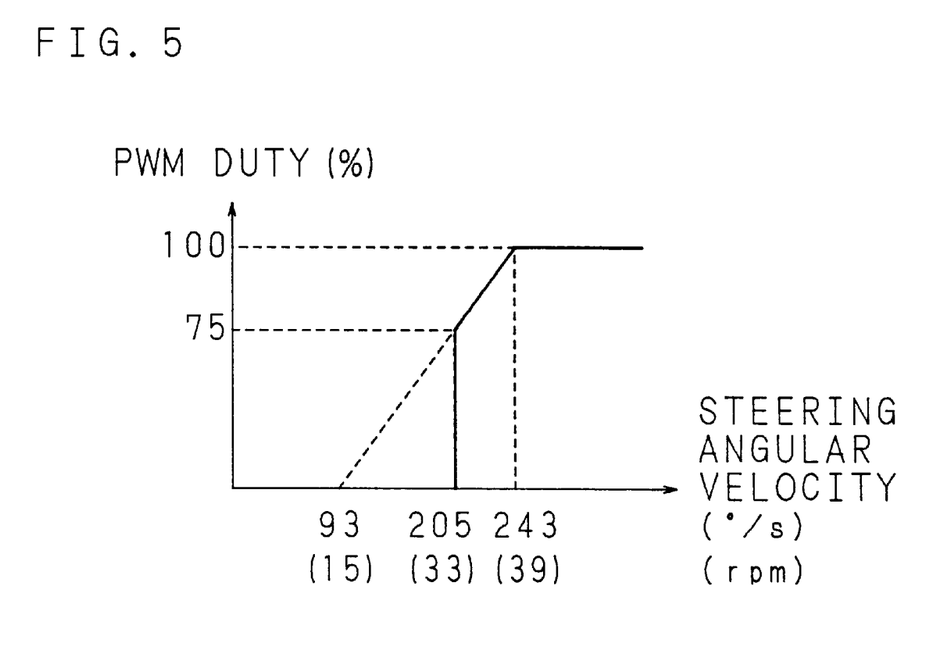
FIG. 5 is a view illustrating the duty factor of PWM to the steering angular velocity of the electric power steering apparatus according to the present invention.

The PWM output calculation value (duty factor) becomes, for example, when the steering angular velocity is 205→243 deg/s, 75→100%, as shown in FIG. 5. Limiting is provided so that the calculated value of the PWM output does not exceed 100% (S42).

When the duty factor given from the duty factor determining unit 25 is larger than the predetermined value, the PWM controller 17 turns off the direction indicators of FETs Q3 and Q4 of the driving circuit 5 on the ground side (S44), so that the FETs Q3 and Q4 are not turned ON in the PWM control. Next, the convergence control flag is set (S46) to carry out the angular velocity difference control calculation (S22).

The step S22 and the following steps S24, S26, and S28 are calculated in any control, in consideration of the continuity of the angular velocity difference control and steering wheel return control with the convergence control.

In case the vehicle speed signal is less than 80 km/h (S12), after clearing the convergence control flag (S20), [if the convergence control flag is not set (S16), after the step S16], for the purpose of the inertia compensation of the motor M, the current value corresponding to the differential value of the steering torque signal and the vehicle speed is calculated (S22) and provided to the addition means 14.

Next, when the steering torque is in the dead zone, in the addition means 14, the target current value (S14) from the steering wheel return controller 22 selected by the comparative selector 13 and the calculated (S22) current value are added to calculate (S24) the motor current target value. When the steering torque is outside the dead zone, the target current value (S23) from the assist controller 12 selected by the comparative selector 13 and the calculated (S22) current value are added to calculate the motor current target value (S24).

With respect to the motor current target value, there is obtained a deflection from the feedback value of the driving current of the motor M detected by the motor current detection circuit 6 in the subtraction means 15, and the deflection is provided to the PI controller 16. The PI controller 16 adds the deflection (proportional element) and the integrated value of the deflection (integrated element) to the previous control amount (S26), and provides the resulting amount to the PWM controller 17 as the current control amount.

Next, in the PWM controller 17, if the convergence control flag is not set (S28), this control amount is converted to a PWM wave signal and the signal to represent the rotation direction of the motor M and provided to the driving circuit 5 (S30, S32).

The motor M rotates in the direction to follow the direction indication by the step that the FET couple Q1 and Q4 or Q2 and Q3 in which the direction indications are turned ON, are ON/OFF by the PWM wave signal.

If the convergence control flag is set (S28), the direction indications of FETs Q1 and Q2 on the high voltage side of the driving circuit 5 are turned ON (S48) to provided to the driving circuit 5 the PWM wave signal based on the duty factor from the duty factor determining unit 25 (S32).

In the motor M, the FET couple Q1 and Q2, in which the direction indications are ON, is turned ON/OFF by the PWM wave signal. Hence, in the motor M, a circuit in which the current runs by the inverse electromotive force generated by coasting rotation is formed by the PWM control (both terminals of the motor M are short-circuited), and the rotating motion is restricted by the braking force exerted by this current.

Figure 7A:
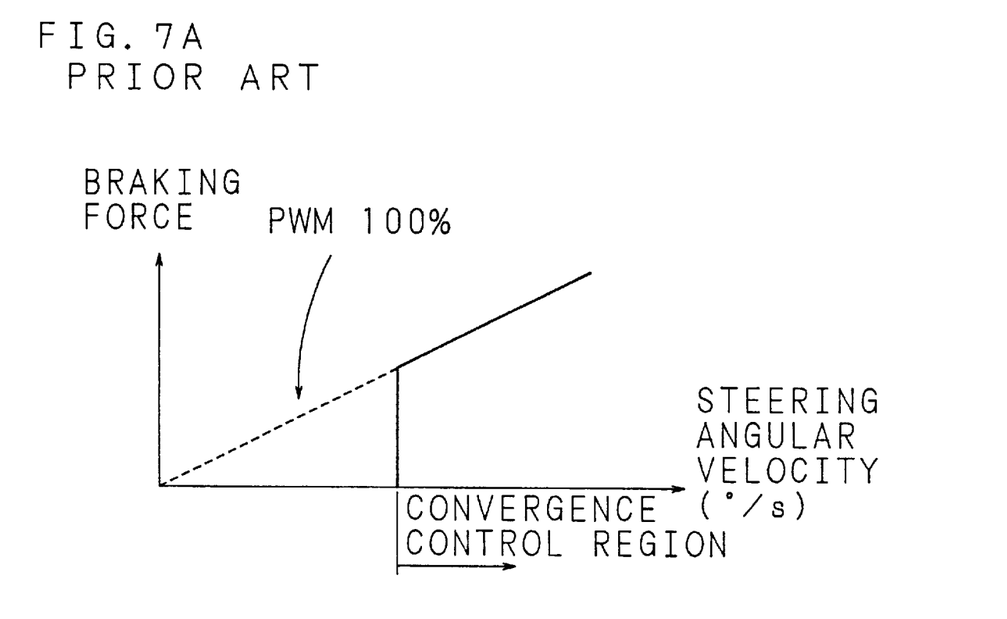
FIG. 7A is a view showing braking force characteristics as a function of the steering angular velocity in the conventional apparatus.
Figure 7B:
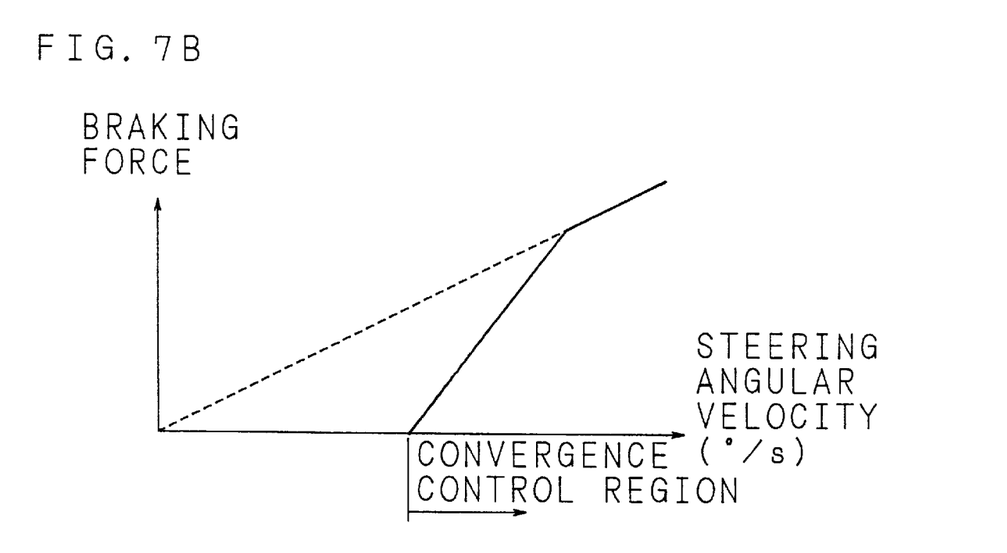
FIG. 7B is a view show braking force characteristics as a function of the steering angular velocity in the present invention apparatus.

According to the convergence control and not dependent on the conventional PWM control (same as the control based on 100% duty factor), as shown by the prior art characteristic of braking force versus to the steering angular velocity of (FIG. 7A), when the steering angular velocity comes into the convergence control zone, suddenly a large braking force is applied and a large shock is given to the steering wheel. However, in the convergence control by the aforementioned PWM control, as shown by the characteristic of braking force versus steering angular velocity of FIG. 7B, even when the steering angular velocity comes into the convergence control zone, the braking force gradually increases with the increase in the steering angular velocity. Accordingly, the shock to be applied to the steering wheel is small.

Figure 1:
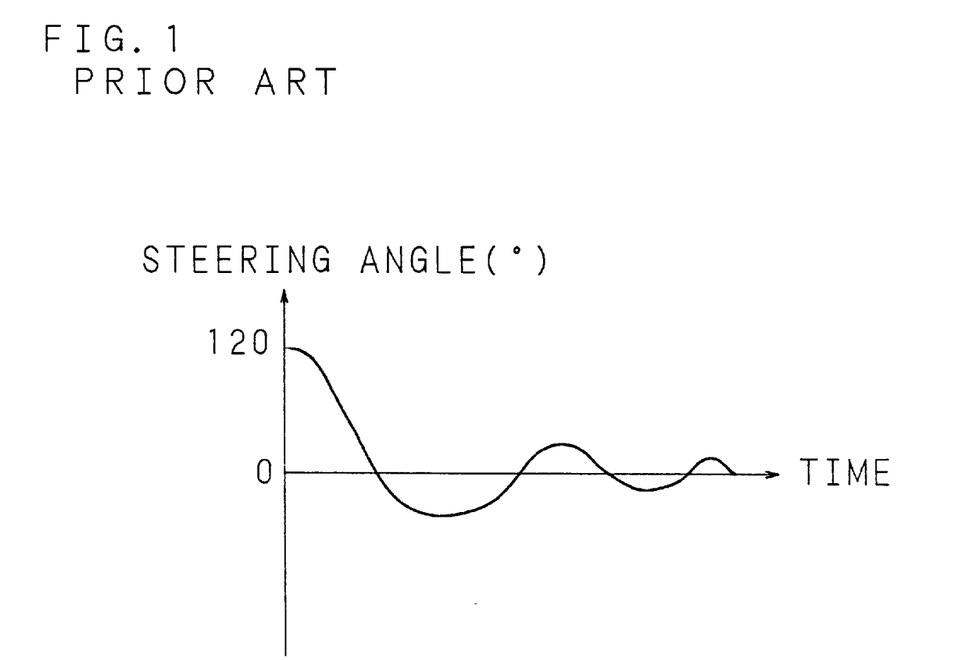
FIG. 1 is a view for illustrating convergence of a steering wheel to a neutral position in a conventional electric power steering apparatus.
Figure 8:
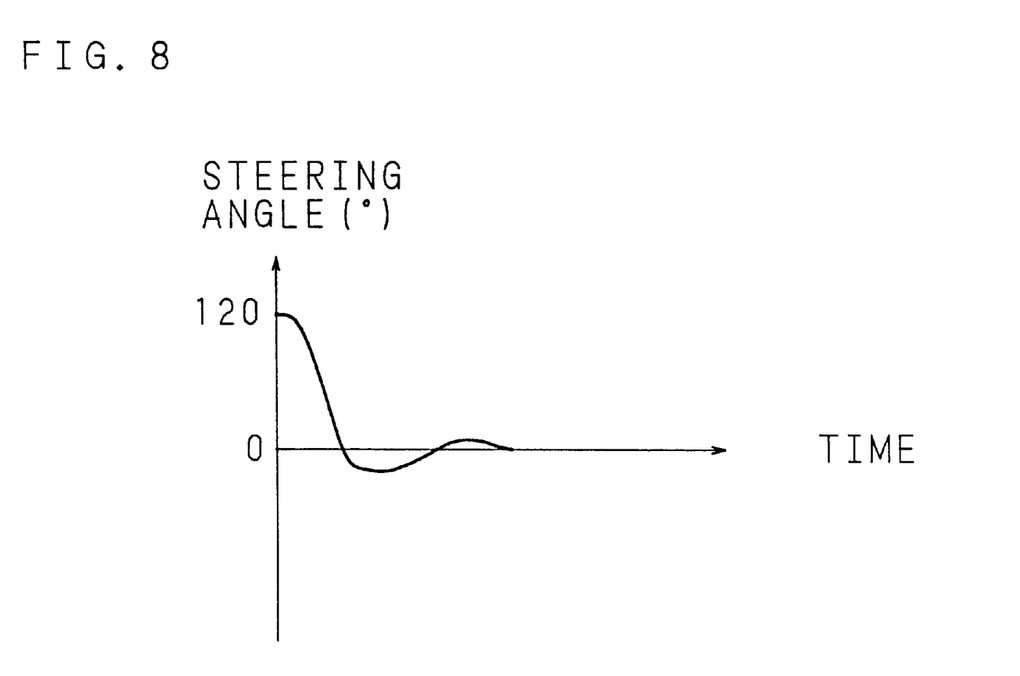
FIG. 8 is a view illustrating convergence of the steering wheel to the neutral position in the electric power steering apparatus according to the present invention.

Further, in the convergence control by the aforementioned PWM control, as shown in FIG. 8, the number of times which the steering wheel over shorts the neutral position (0 deg) decreases in comparison with the case of the conventional motion as shown in FIG. 1, so that the steering wheel quickly converges to the neutral position to stop its rotation.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. An electric power steering apparatus for a vehicle having a steering wheel, comprising:

an electric motor for assisting steering force;

detecting means for detecting motor current flowing in said motor;

a torque sensor for detecting steering torque generated by the steering wheel and outputting a detected value representing the steering torque;

means for determining a target value of the motor current based on the detected value outputted from the torque sensor;

driving means for driving the motor by PWM control so that the detected motor current comes to be the target value;

dead zone detecting means for detecting whether the detected value of the steering torque is in a predefined dead zone;

steering angular velocity detecting means for detecting the rotation speed of the steering wheel; and motor braking means for braking the motor in response to the dead zone detecting means by short-circuiting the motor terminals by the PWM control in proportion to the rotation speed of the steering wheel detected by the steering angular velocity detecting means.

2. An electric power steering apparatus according to claim 1, further comprising absolute steering angle detecting means for detecting a steering angle from the neutral point of a steering angle of the steering wheel, wherein the motor braking means brake said motor when the steering angle detected by the absolute steering angle detecting means is smaller than a predefined value of steering angle.

3. An electric power steering apparatus according to claim 1, wherein the motor braking means increase/decrease a duty factor of the PWM control in accordance with the increase/decrease of the rotation speed when the rotation speed of the steering wheel detected by the steering angular velocity detecting means is larger than a predetermined value of rotation speed.

4. An electric power steering apparatus according to claim 2, wherein the motor braking means increase/decrease a duty factor of the PWM control in accordance with the increase/decrease of the rotation speed when the rotation speed of the steering wheel detected by the steering angular velocity detecting means is larger than a predetermined value of rotation speed.

5. An electric power steering apparatus according to a claim 1, further comprising a vehicle speed sensor, wherein the motor braking means increase/decrease the duty factor of PWM control in accordance with the increase/decrease of the vehicle speed when the vehicle speed of a vehicle speed signal from the vehicle speed sensor is larger than a predetermined value of vehicle speed signal.

6. An electric power steering apparatus according to claim 2, further comprising a vehicle speed sensor, wherein the motor braking means increase/decrease the duty factor of PWM control, in accordance with the increase/decrease of the vehicle speed when the vehicle speed of a vehicle speed signal from the vehicle speed sensor is larger than a predetermined value of vehicle speed signal.

7. An electric power steering apparatus according to claim 3, further comprising a vehicle speed sensor, wherein the motor braking means increase/decrease the duty factor of PWM control in accordance with the increase/decrease of the vehicle speed when the vehicle speed of a vehicle speed signal from the vehicle speed sensor is larger than a predetermined value of vehicle speed signal.

8. An electric power steering apparatus according to claim 4, further comprising a vehicle speed sensor, wherein the motor braking means increase/decrease the duty factor of PWM control is accordance with the increase/decrease of the vehicle speed when the vehicle speed of a vehicle speed signal from the vehicle speed sensor is larger than a predetermined value of vehicle speed signal.

* * * * *